W. L. GROSS.
APPARATUS FOR RELIEVING TIRES FROM THE WEIGHT OF AUTOMOBILES.
APPLICATION FILED JUNE 25, 1918.
1,278,638.
Patented Sept. 10, 1918.
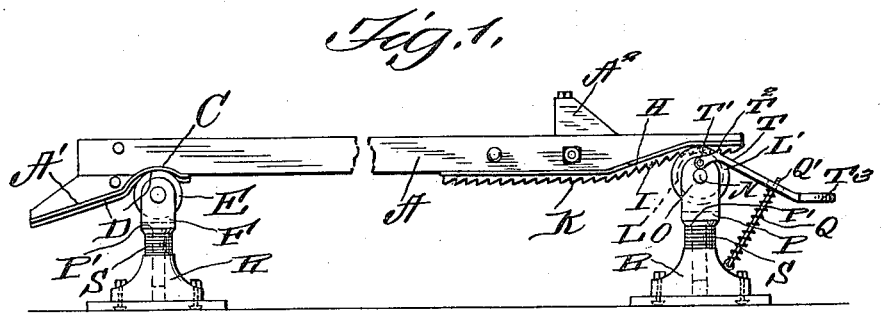
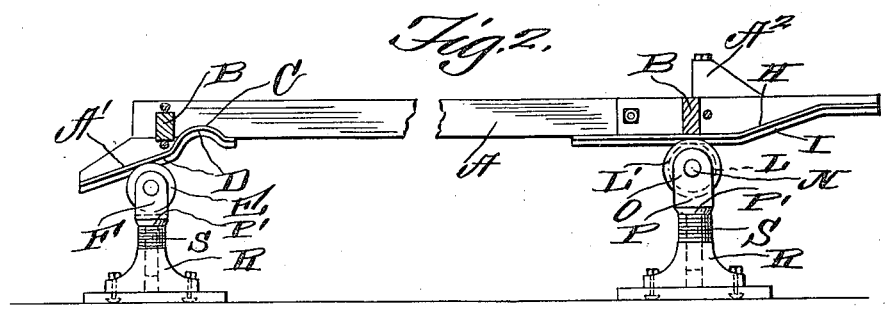
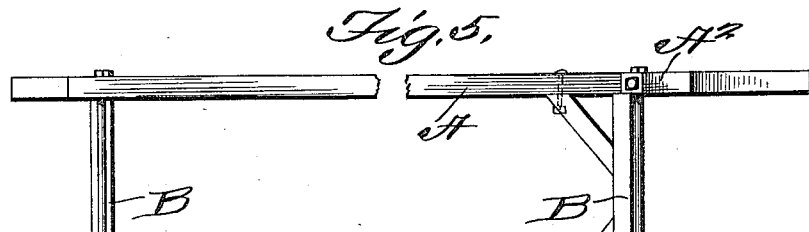
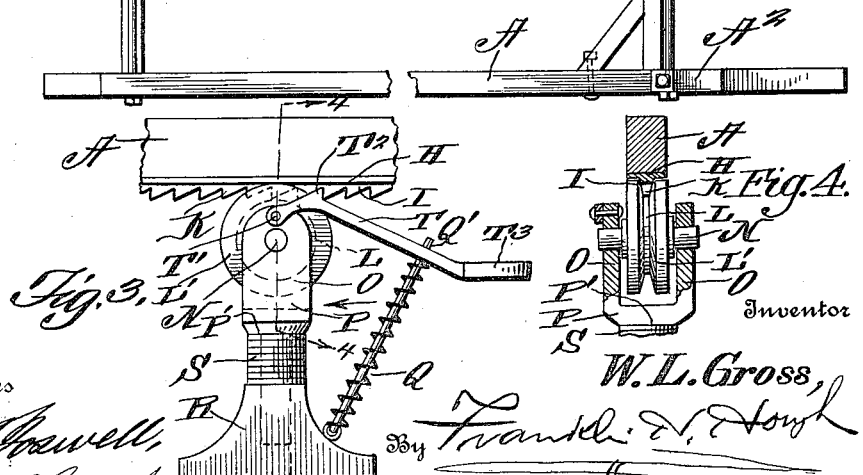

UNITED STATES PATENT OFFICE.

WALTER LEE GROSS, OF CASEY, ILLINOIS.

APPARATUS FOR RELIEVING TIRES FROM THE WEIGHT OF AUTOMOBILES.

1,278,638.  Specification of Letters Patent.  Patented Sept. 10, 1918.

Application filed June 25, 1918. Serial No. 241,847.

*To all whom it may concern:*

Be it known that I, WALTER L. GROSS, a citizen of the United States, residing at Casey, in the county of Clark and State of Illinois, have invented certain new and useful Improvements in Apparatus for Relieving Tires from the Weight of Automobiles, and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for relieving tires from the weights of automobiles when not in use, and consists of a truck upon which the automobile is run and automatically raised, so that the tires will be free from the ground or floor.

The invention consists of a simple and efficient device of this nature, having various other details of construction, combinations and arrangements of parts which will be hereinafter fully described, shown in the accompanying drawings and then specifically defined in the appended claim.

My invention is illustrated in the accompanying drawings which, with the letters of reference marked thereon, form a part of this application and in which:

Figure 1 is a side elevation, showing the truck before being elevated.

Fig. 2 is a central view, showing the truck raised and held in such position.

Fig. 3 is an enlarged detail in elevation, showing the catch for holding the truck elevated.

Fig. 4 is a cross sectional view, and

Fig. 5 is a plan view of the frame.

Reference now being had to the details of the drawings by letter:

A, A designate the parallel beams of the truck connected together by cross pieces B. Said beams have concaved recesses C formed opposite each other near the rear ends thereof, and each recess and the inclined portions A', intermediate the recesses and the rear ends of the truck, are ironed with shoes D, in order to protect the same, and which ironed portions are adapted to rest upon the wheels E journaled in suitable bearings F. The forward portions of the beams A, A are inclined, as shown, and ironed with the plates H which, as shown in detailed view in the drawings, are provided with ribs I, one of which has serrations K thereon, and which ribs engage grooves L formed in the wheels L' which are mounted upon suitable spindles N which are journaled in the arms O of the forked members P. Said members P are mounted in socket members R, and S are washers which are mounted upon the shank portion of the forked member, and interposed between the member R and a shoulder P', and serve to hold the truck at different elevations, according as more or less of the washers are used upon the shank portion of the forked member.

A catch T is pivotally mounted upon a pin T' upon one of the forked arms and has a tooth T² projecting therefrom, designed to engage one or another of the serrations K, for the purpose of holding the truck in an adjusted position. Said catch T has at its forward end a cross piece T³, forming a pedal whereby the foot of the operator may depress the catch to release the tooth T² from the serrations K, when it is desired to move the truck forward or backward. Said catch is held at its highest position through the medium of the spring Q mounted upon a rod Q', and which latter is fastened to one of the members R.

Rising from the upper edge of the beams A, A are the cleats A², which project in the path of the forward axle of the automobile and against which cleats the axle contacts, causing the truck to move forward with the automobile, for the purpose of raising the truck from the position shown in Fig. 1 of the drawings, to that shown in Fig. 2 of the drawings.

In operation, the automobile is moved over the rear end of the truck, and when the forward axle comes in contact with the cleats, the truck is moved forward, the inclined portions at the forward end of the truck riding upon the forward wheels, causing the forward end of the truck to be elevated, and the rear wheels coming in contact with the inclined edges A' at the rear end of the truck, will cause the rear end of the truck to be elevated, clearing the tires from the ground or floor. The tooth T² upon the catch T will engage automatically one or another of the serrations K, and hold the truck from moving backward. The elevation at which it is desired to have the automobile held may be regulated by placing washers upon the shank portion of the forward forked members. When it is desired to release the automobile, it may be done by the operator depressing the forward end of the spring pressed catch sufficient to cause the tooth $T^2$ to disengage the serrations K, and by pushing the automobile rearward, the truck may be moved back to the position shown in Fig. 1 of the drawings.

What I claim to be new is:

A device for relieving tires from the weight of automobiles, comprising a truck having inclined portions near its ends, shoes fastened to the inclined portions at the rear of the truck and each shoe having a concaved recess, standards, wheels journaled thereon and upon which said shoes are adapted to travel, the inclined recesses near the forward ends of the truck having angled ribs thereon, one of which is provided with serrations, adjustable standards, grooved pulleys journaled therein and in which said ribs are adapted to travel and guided thereby, a spring pressed tread member pivotally mounted upon one of the standards and having a tooth for engagement with said serrations, an abutment member upon the upper portion of the truck against which the axle of an automobile is adapted to contact.

In testimony whereof I hereunto affix my signature in presence of two witnesses.

WALTER LEE GROSS.

Witnesses:
ERNEST E. EARL,
GEORGE ORNDORFF.